United States Patent [19]

Spence

[11] 3,806,880

[45] Apr. 23, 1974

[54] MULTIPLEXING SYSTEM FOR ADDRESS DECODE LOGIC

[75] Inventor: John R. Spence, Villa Park, Calif.

[73] Assignee: North American Rockwell Corporation, El Segundo, Calif.

[22] Filed: Dec. 2, 1971

[21] Appl. No.: 204,015

[52] U.S. Cl.......... 340/172.5, 340/166 FE, 307/205, 307/304

[51] Int. Cl........................... G11c 7/00, G06f 13/06

[58] Field of Search... 340/172 S, 173 AM, 166 FE, 340/174, 173 R; 307/205, 251, 215, 209

[56] References Cited

UNITED STATES PATENTS

| | | | |
|---|---|---|---|
| 3,231,862 | 1/1966 | Blosk et al. | 340/172.5 |
| 3,302,187 | 1/1967 | Voigt | 340/172.5 |
| 3,354,430 | 11/1967 | Zeitler et al. | 340/172.5 |
| 3,409,879 | 11/1968 | Keister | 340/172.5 |
| 3,560,940 | 2/1971 | Gaensslen | 340/172.5 |
| 3,609,665 | 9/1971 | Kronies et al. | 340/172.5 |
| 3,638,194 | 1/1972 | Matsushita et al. | 340/172.5 |
| 3,665,426 | 5/1972 | Gross et al. | 340/172.5 |
| 3,478,333 | 11/1969 | Faulkner | 340/174 |
| 3,560,942 | 2/1971 | Enright, Jr. | 340/173 |
| 3,623,022 | 11/1971 | Day | 340/172.5 |
| 3,629,842 | 12/1971 | Taylor | 340/172.5 |
| 3,691,534 | 9/1972 | Varadi et al. | 340/173 R |
| 3,703,707 | 11/1972 | Bovett | 340/172.5 |
| 3,564,517 | 2/1971 | McLean | 340/174 |

*Primary Examiner*—Paul J. Henon
*Assistant Examiner*—James D. Thomas
*Attorney, Agent, or Firm*—G. Donald Weber, Jr.; H. Frederick Hamann; John R. Shewmaker

[57] ABSTRACT

Address decode logic is multiplexed for selectively decoding input address of a read-only memory (ROM) and a random-access memory (RAM) and for supplying the decoded addresses to the appropriate one of the memories. ROM and RAM input signal paths are controlled in alternate succession to alternately apply ROM and RAM address input signals to the decode logic. Output signal paths from the decode logic to both the ROM and the RAM are similarly controlled in alternate succession to supply decoded address signals to the appropriate one of the memories. The arrangement is implemented using field effect transistors.

10 Claims, 4 Drawing Figures

INVENTOR
JOHN R. SPENCE
BY Robert G. Rogers
ATTORNEY

INVENTOR
JOHN R. SPENCE
BY Robert G. Rogers
ATTORNEY

INVENTOR
JOHN R. SPENCE
BY Robert G. Rogers
ATTORNEY

MULTIPLEXING SYSTEM FOR ADDRESS DECODE LOGIC

BACKGROUND OF THE INVENTION

1. Field of the Invention

The invention relates to a memory system and more particularly to address decode logic for such a system.

2. Description of Prior Art

A computational system such as a calculator may utilize read-only memories (ROM's), random-access memories (RAM's) and combinations of both memories. *X* and *Y* address decode logic circuits are required to address appropriate locations in the memories. A decode logic circuit is ordinarily required for the *Y* addresses of each memory as well as for the *X* addresses for each memory. As a result, a relatively large number of devices, such as field effect transistors, and relatively increased amounts of semiconductor substrate layout area are required. The expense and processing time are similarly increased.

It would be preferred if the number of decode circuits could be reduced. Substantially less substrate area as well as substantially less cost would be required to produce a functionally comparable calculator system. For example, a calculator system requiring *X* and *Y* decode logic for a ROM and a RAM in a calculator may require from two to five semiconductor chips (integrated circuits). By utilizing a multiplexed decode logic circuit as described herein, one semiconductor chip may be utilized.

SUMMARY OF THE INVENTION

Briefly the invention comprises address decode logic which is time-shared (multiplexed) by first and second memories, such as a read-only memory (ROM) and a random-access memory (RAM). An address cycle for both memories is divided into a ROM address interval followed by a RAM address interval. The ROM and RAM address intervals are each subdivided into an address input setup interval, a decoder precharge interval, and an address evaluation interval.

Input logic gating circuitry provides parallel input processing paths for the RAM and ROM address bits. The circuitry of each processing path for the ROM and RAM inputs is clocked by different multiple phase clock signals corresponding to the subdivided intervals described above so that ROM signals representing ROM address bits are gated to the address decode logic during the ROM address interval and RAM signals representing RAM address bits are gated to the address decode logic during the RAM address cycle.

Appropriate isolation field effect transistors and drive field effect transistor circuits are provided between the multiplexed decode logic circuitry and the RAM and ROM components to gate the output signals representing decoded addresses to the appropriate memory.

Therefore, it is an object of this invention to provide an improved computer system in which the address decode logic is time-shared by a ROM and a RAM of the system.

A still further object of this invention is to provide a multiplexed address decode logic circuit for addressing a plurality of memories during different intervals of an address cycle.

A still further object of this invention is to provide address decode logic which receives address inputs for a ROM and a RAM at different subintervals of a one bit address cycle.

Another object of this invention is to provide an improved calculator system using multiplexed decode logic for reducing the substrate area required for laying out the calculator system.

A still further object of this invention is to provide time-shared address decode logic for reducing the processing time and expense for producing a calculator system.

These and other objects of this invention will become more apparent when taken in connection with the description of the drawings, a brief description of which follows:

DESCRIPTION OF THE PREFERRED EMBODIMENTS

Figure 1:
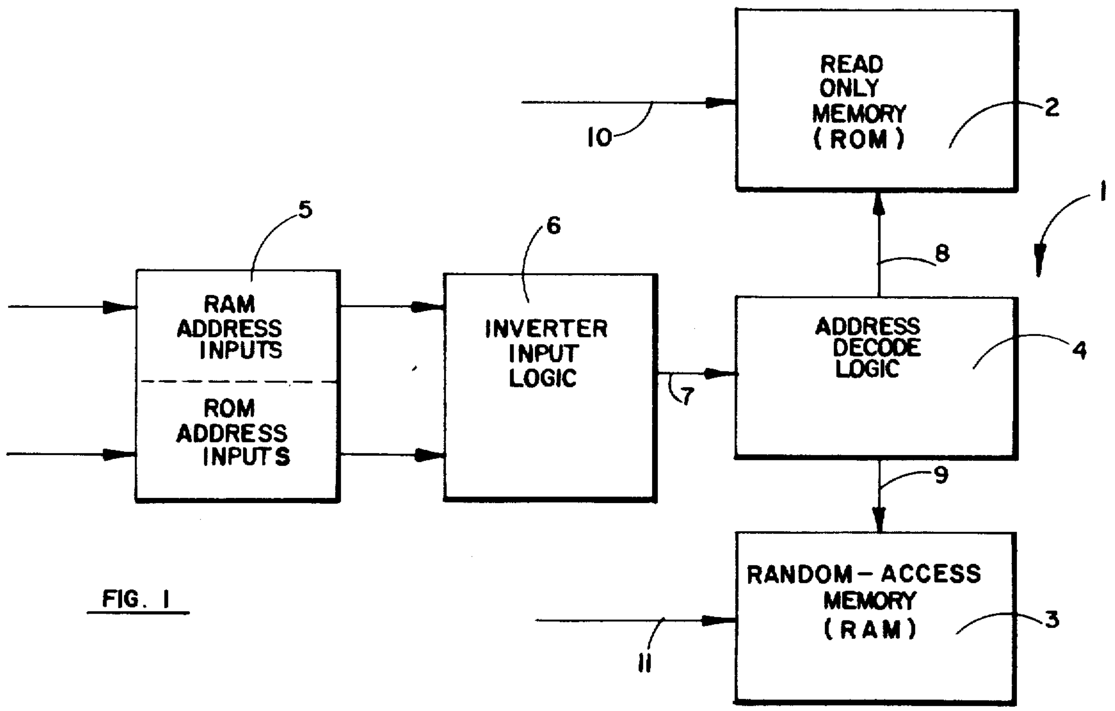
FIG. 1 is a block diagram of a portion of a computer system such as a calculator showing a multiplexed decode logic between a read-only memory (ROM) and a random-access memory (RAM) including input logic for providing address input signals to the decode logic.

FIG. 1 is a block diagram of a portion of a calculator system 1 comprising a read-only memory (ROM) 2, and a random-access memory (RAM) 3, together with time-shared address decode logic 4 in accordance with the present invention. The address decode logic decodes address input signals from RAM and ROM address input logic gating circuitry 5 and supplies the decoded addresses to the appropriate one of the ROM or RAM. The outputs from the logic gating circuitry 5 are connected through inverter input logic 6 in providing the address input signals to the address decode logic, with the address input signals representing address bits of the particular address to be decoded.

Figure 2:
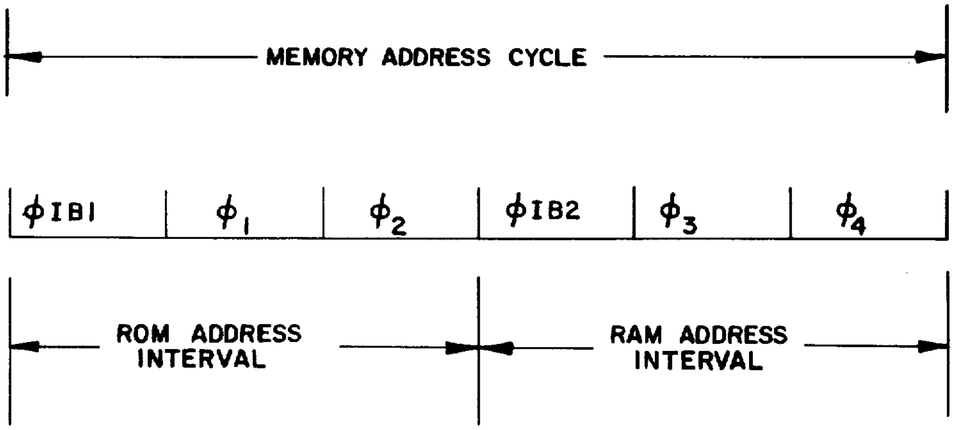
FIG. 2 is a scale showing a memory address cycle including the division of the cycle into a ROM address interval and a ram address interval which are each further subdivided into individual timing intervals for processing address signals through the decode logic of FIG. 1 into the appropriate address of the ROM or RAM.

As shown in FIG. 2, a memory address cycle for the system is divided into a ROM address interval and a RAM address interval. The ROM address interval comprises three sub-intervals $\phi IB1$, $\phi_1$ and $\phi_2$. The RAM address interval comprises $\phi IB2$. $\phi_3$ and $\phi_4$.

Figure 4:
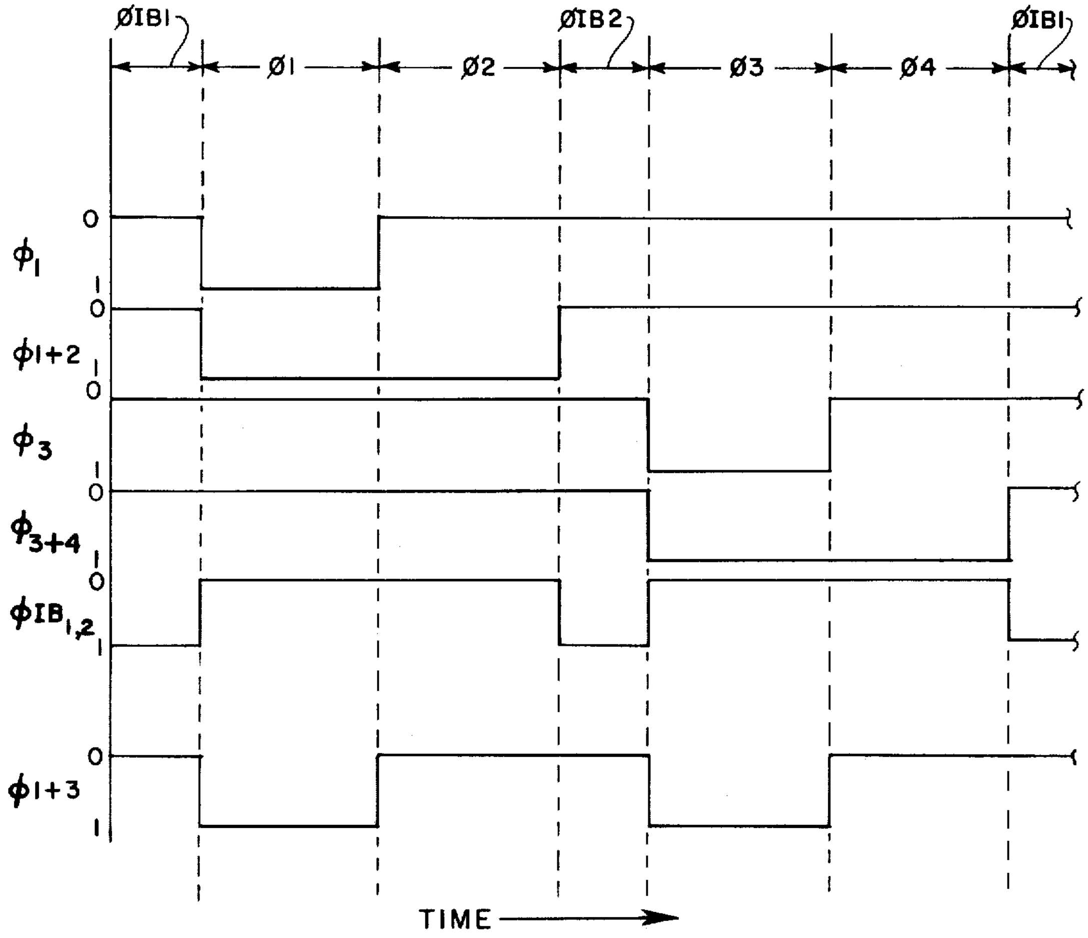
FIG. 4 is a signal diagram of the clocking signals used to control the memory address cycle for both the ROM and RAM.

The three sub-intervals within both the ROM address interval and the RAM address interval are designated the address input setup interval ($\phi IB1$ and $\phi IB2$), the decoder precharge interval ($\phi_1$ and $\phi_3$), and the address evaluation interval ($\phi_2$ and $\phi_4$). The clock signals employed during the memory address cycle are illustrated in FIG. 4.

It will be noted that the clock signals include a conventional four-phase major-minor arrangement with double-width (major) signals $\phi_{1+2}$ and $\phi_{3+4}$ and single-width (minor) signals $\phi_1$ and $\phi_3$, together with additional clock $\phi_{1+3}$. The intervals between $\phi_4$ and $\phi_1$ and between $\phi_2$ and $\phi_3$ are referred to as "In-Between" intervals and are designated IB1 and IB2, with the clock provided during these intervals identified as $\phi$IB1,2.

Looking first at the ROM address interval, during $\phi$IB1, the inverter input logic 6 sets up the address input lines of the address decode logic 4. Next during $\phi_1$, the ROM address input signals are gated via line 7 to the address decode logic 4. In addition, semiconductor region address output lines (not shown) inside the address decode logic, each representing a different address, are precharged to a first voltage level. The address decode logic is isolated from the ROM and RAM during the precharge interval.

Thereafter, during the $\phi_2$ interval, the precharged address output lines are discharged as a function of the address input signals on line 7. For the particular embodiment shown in FIG. 3, only one address output line remains charged. The other regions are discharged to a second voltage level, e.g., electrical ground. Subsequently, the address output lines are electrically connected to the ROM to deliver the decoded ROM address (represented by the one charged address line) as an input to the ROM. The electrical connections between the address output lines of the address decode logic 4 and the read-only memory are represented by line 8. It is also pointed out that line 7 between the inverter input logic and the address decode logic 4 represents a number of input lines as a function of the maximum number of decodable addresses. Similarly, the electrical connection between the address output lines and the random-access memory 3 are represented by line 9.

The RAM address interval follows the ROM address interval. Processing of RAM addresses occurs in a manner virtually identical to that of ROM addresses. Thus, during $\phi$IB2, the inverter input logic sets up the address input lines of the address decode logic 4. During $\phi_3$, the RAM address input signals are gated via line 7 to the address decode logic 4 and the semiconductor region address output lines of the address decode logic are again precharged. Thereafter, the address output lines are discharged during $\phi_4$ as a function of the address being decoded. The address output line remaining charged, i.e., isolated from electrical ground during $\phi_4$, is subsequently electrically connected along with the other address output lines to the RAM. The charged address output line represents the decoded address.

It should be pointed out that the address decode logic 4 illustrates *X* address inputs only for the ROM and RAM. The *Y* address inputs are represented generally by lines 10 and 11 in FIG. 1. Similar time-shared address decode logic could be provided for the *Y* address inputs. However, for purposes of the description, it is not believed necessary to show an additional block representing the *Y* address decode logic. Appropriate address input logic gates and inverter input logic would also be required. Similarly, the circuitry for generating the RAM and ROM address inputs as well as circuitry for generating the clock signals which define the memory address cycles are not shown. The particular circuit elements are not necessary to describe the multiplex, or time-shared, address decode logic circuit shown.

Figure 3:
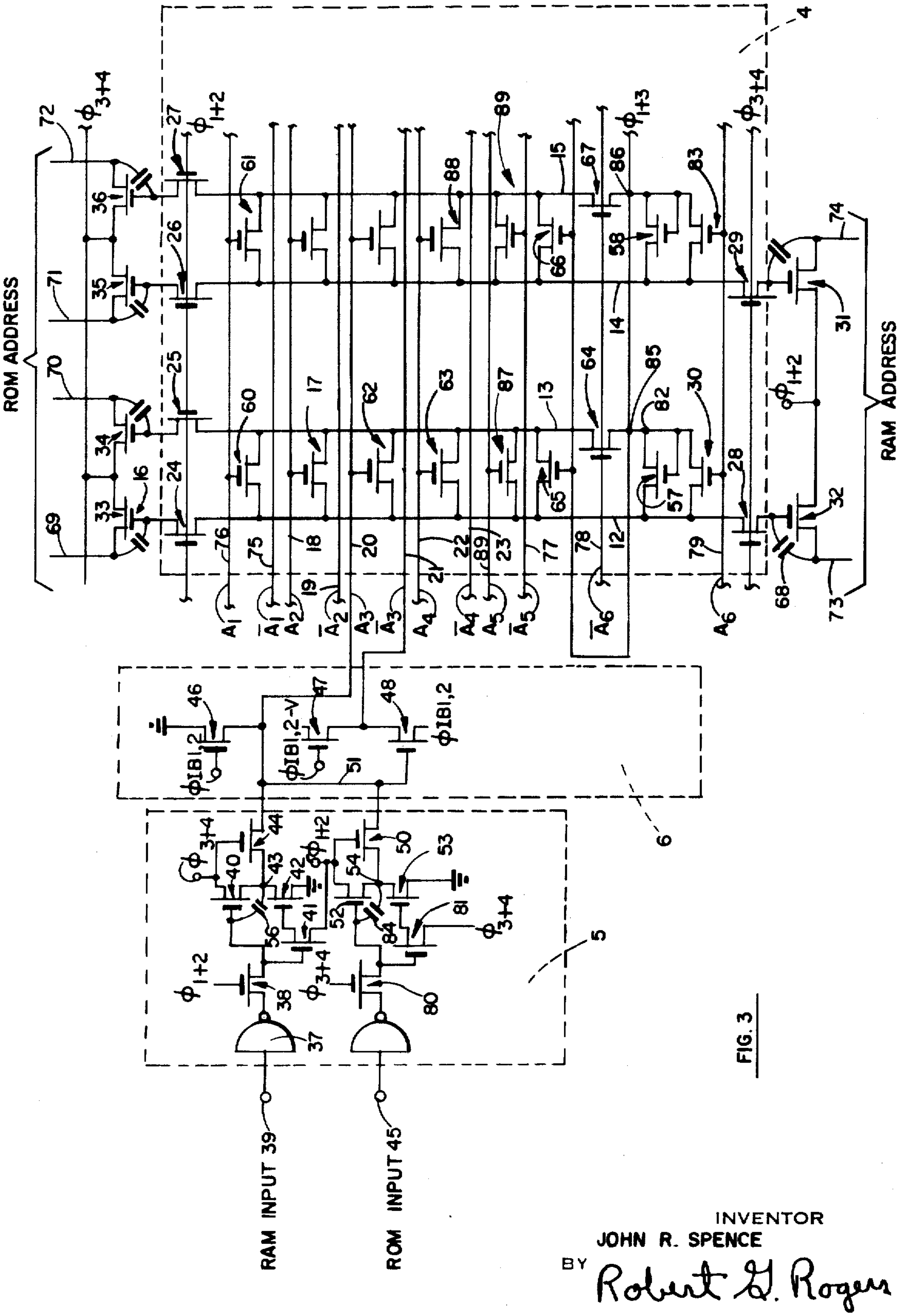
FIG. 3 is a schematic diagram of a portion of the input logic and the time-shared decode logic for implementing the circuit of FIG. 1.

FIG. 3 is a specific embodiment of one circuit for implementing the RAM/ROM address input logic gating circuitry 5, the inverter input logic 6 and the address decode logic 4 shown in FIG. 1 and employs the clock signals illustrated in FIG. 4. The address decode logic 4 corresponds in several broad respects the the address decode logic shown in U.S. Pat. No. 3,665,473 in that it employs a plurality of semiconductor region address output lines 12, 13, 14, 15 having coupling transistors, e.g., 60, 61, 17, etc., disposed between adjacent paired address output lines, as necessary to provide the different address locations in the decode logic. Address input signals $\overline{A_1}$–$\overline{A_6}$ and their complements $A_1$ -$A_6$ are received on address input lines 18-23, 75-79, and 89, and the address input lines are appropriately connected to the gates of selected ones of the coupling transistors. An address represented by the input address signals is decoded by the address decode logic 4 and the decoded address is provided as an electrical output signal on one or more of the address output lines 12-15.

Portions of the input logic gating circuitry 5 and the inverter input logic 6 are illustrated in FIG. 3 for the $A_3$ and $\overline{A_3}$ bit positions with the output from logic 6 connected to the appropriate address input line 20 and 21 for these bit positions. It should be understood that corresponding additional portions of the input logic gating circuitry 5 and the inverter input logic 6 are provided for each bit position of the decode logic. For example, if the address decode logic can decode 64 possible addresses, logic circuitry 5 and 6 would be repeated six times for the $A_1$, $\overline{A_1}$; $A_2$, $\overline{A_2}$; $A_3$, $\overline{A_3}$; $A_4$, $\overline{A_4}$; $A_5$, $\overline{A_5}$; and $A_6$, and $\overline{A_6}$ pairs of signals. For simplicity, only the $A_3$, $\overline{A_3}$ logic circuitry is shown. Similarly, although address output lines 12, 13, 14 and 15 representing semiconductor regions are shown, it should be understood that for a 64 address decode logic circuit 64 such address output lines would be provided. The output signals on each address output line represents decoded addresses. The presence or absence of coupling field effect transistor, e.g., transistors 60 and 61, etc., between lines 12 and 13 and 14 and 15 respectively determine the address represented (decoded) by each output line. For example, output line 12 may decode into the address represented when $A_1$, $A_2$, $A_3$, $A_4$, $A_5$ and $A_6$ are false. In other words, when each of $A_1$–$A_6$ is false (and therefore the transistors connected between lines 12 and 13 are off) the address line 12 remains high while all other address lines are discharged. Similarly, line 13 may decode into the address represented when $A_1$, $A_2$, $A_3$, $A_4$, and $A_5$ are false and $A_6$ is true.

The output signals on address output lines 12–15 may represent either ROM or RAM addresses and, in accordance with an important aspect of the present invention circuitry is provided to gate the output signals to the appropriate one of the ROM or RAM. Considering the ROM addresses first, and still referring to FIG. 3, isolation transistors 24, 25, 26 and 27 are provided in series with respective address output lines 12, 13, 14 and 15. Bootstrap transistor drive circuits 33, 34, 35 and 36 are provided at the output of the respective isolation transistors 24 through 27 with the outputs of the isolation transistors connected to the gate electrodes of the bootstrap transistors. The outputs of the bootstrap circuits are, in turn, connected to the ROM over respective lines 69, 70, 71, and 72 (which collectively correspond to line 8 in FIG. 1). The isolation transistors are clocked on by the $\phi_{1+2}$ clock (FIG. 4) applied their gate electrodes while the bootstrap transistors are subject to being rendered conductive by the $\phi_{3+4}$ clock (FIG. 4) applied to a main electrode of each in conjunction with a signal on their gate electrode.

In operation, the signals on address lines 12–15, representing an address for delivery to the ROM, are clocked through isolation transistors 24–27 (during $\phi_2$) to the bootstrap drive circuits 33–36 and are subsequently, during $\phi_{3+4}$, driven out by the drive circuits to the ROM. Assuming, for example, the signal on address output line 12 was high, and the remaining signals on address output lines 13–15 were low, then the ROM would receive an address represented by a high signal on line 69 and low signals on line 70–72.

RAM addresses are delivered in a similar manner only during different time intervals through different circuitry. For this purpose, and still referring to FIG. 3, isolation transistors 28 and 29 are provided at the opposite ends of address lines 12–15 and are connected by means of bootstrap transistor drive circuits 32 and 31 to the RAM over lines 73 and 74 (which collectively correspond to line 9 in FIG. 1). The number of RAM addresses is typically much less than the number of ROM addresses and, for this reason, the number of RAM isolation and bootstrap circuits is half that employed for the ROM. By NAND gate 37 which is evaluated during $\phi_2$. The output of isolation field effect transistor 38 (clocked on during $\phi_{1+2}$) becomes true if the input on line 39 was low or false. As a result, the voltage level at the gate electrode of bootstrap field effect transistor driver 40 is true (high) and the voltage level on the gate electrode of field effect transistor 41 is also true so that both field effect transistor 41 and the bootstrap field effect transistor circuit 40 are true. As a result, the output at point 43 between the bootstrap driver circuit 40 and the field effect transistor 42 is boosted true during $\phi_{3+4}$ by bootstrap field effect transistor 40. Note that after $\phi_{1+2}$, the $\phi_{1+2}$ clock connected to the main electrode of transistor 41 returns to ground to discharge the gate of transistor 42 through transistor 41 to turn off transistor 42 and leave point 43 true. Since isolation field effect transistor 44 of the RAM processing path is off during $\phi_{1+2}$, the RAM processing path is isolated from the ROM processing path at that time. During $\phi_{3+4}$, the voltage level (logic state) at point 43 is boosted to a true level by boost transistor 40 and clock $\phi_{3+4}$ turns on isolation transistor 44 to deliver this boosted RAM voltage level to the inverter input logic 6 comprised of field effect transistors 46, 47, and 48. Although isolation field effect transistor 80 of the ROM logic gate is turned on during $\phi_{3+4}$, to receive ROM input information the isolation field effect transistor 50 between point 54 of the ROM processing path and the inverter input logic 6 is held off during $\phi_{3+4}$, for isolating the ROM processing path from the inverter input.

In accordance with an important aspect of the invention, immediately prior to passing either RAM or ROM information from the logic gating circuitry 5, through the inverter input logic 6, to the address decode logic 4, the inverter input logic 6 is employed to set up the address input lines of the address decode logic 4 by precharging one and discharging the other address input line of each pair of lines receiving complemented input bits. This address input setup interval occurs during the in-between phase $\phi$IB1 or $\phi$IB2 immediately preceding the passage of RAM or ROM information to the address decode logic 4. Still referring to FIG. 3, address input lines 20 and 21 are illustrated for receiving complementary address input bits $A_3$ and $\overline{A_3}$, respectively. As stated, inverter input logic 6 serves to initially precharge line 21 (since line 21 is to later receive the complemented bit $\overline{A_3}$ and is thus termed the complemented line) and to discharge line 20. Thus, for the RAM address interval line 21 is precharged and line 20 is discharged during $\phi$IB2. Subsequently, during $\phi_{3+4}$, isolation transistor 44 gates RAM addresses through the inverter input logic 6 to the address input lines of the address decode logic 4. Similarly, the ROM address interval setup occurs durings $\phi$IB1, and immediately afterward, during $\phi_{1+2}$, isolation transistor 50 gates ROM addresses to the address decode logic. During each application of address input signals through isolation transistors 44 or 50 to the address decode logic 4, the initial setup condition of each pair of address input lines will either remain the same or be reversed depending upon the logic state of the address input signals.

Considering further the above described precharge of the complemented address input lines during the address input setup interval, and referring specifically to the processing of RAM addresses, the clock signal $\phi$IB 1,2 becomes true immediately before $\phi_{3+4}$, (i.e., during $\phi$IB2). As a result, referring again to FIG. 3, address input line 20 is connected to a second voltage level, e.g., electrical ground, through field effect transistor 46. Similarly, input line 21 is connected to $-V$ and precharged through field effect transistor 47 which is turned on by the $\phi$IB1,2 clock on its gate electrode. Field effect transistor 48 is held off by the electrical ground voltage on line 20 which is connected via line 51 to the gate electrode of field effect transistor 48.

Thereafter during $\phi_{3+4}$, if the voltage at point 43 is false, i.e. if the RAM input at 39 is true, line 21 remains charged or true. Field effect transistors 46 through 48 are held off during the $\phi_{3+4}$interval since $\phi$IB1,2 is false. similarly, line 20 remains discharged or false. However, if point 43 had been true, i.e., if 39 was false, the voltage level on line 21 would have been discharged through field effect transistor 48 to the electrical ground provided by the $\phi$IB1,2 clock signal. In addition, line 20 would have been charged to the true voltage level at point 43 through isolation field effect transistor 44. Subsequently, at the end of the $\phi_{3+4}$ period, field effect transistor 44 would be turned off for isolating the lines 20 and 21 from the logic gating circuitry.

The ROM processing path within logic gating circuitry 5 is similarly comprised of bootstrap field effect transistor circuit 52, and field effect transistor 53 for establishing a ground level at point 54. The gate electrode of field effect transistor 53 is connected to field effect transistor 84. Capacitor 81 is utilized to implement the bootstrap circuit of circuit 52 as capacitor 56 is utilized to implement bootstrap field effect transistor circuit 40 in the RAM processing path. The inverter input logic circuit 6 is utilized by both the RAM and ROM processing paths.

During the decoder precharge interval ($\phi_1$ or $\phi_3$) the address output lines of the address decode logic 4 are precharged and during the succeeding address evaluation interval, the decode logic 4 is evaluated to drive the output signals on the address output lines for gating to the appropriate one of the ROM or RAM. The $\phi_{1+3}$ clock (FIG. 4) is true during precharge intervals $\phi_1$ and $\phi_3$ for effecting the precharge operation. Return of the $\phi_{1+3}$clock to ground level during evaluation intervals $\phi_2$ and $\phi_4$ initiates the evaluation of the decode logic 4. For example, during $\phi_3$ (or $\phi_1$), the $\phi_{1+3}$ clock becomes true for applying a precharge voltage level through (See FIG. 3) transistors 57 and 58 to address output lines 12 and 14; to address output line 13 through field effect transistors 57 and 65; to address output line 15 through field effect transistors 58 and 66. Therefore, the address output lines 12 through 15 etc. are precharged during $\phi_3$. During $\phi_4$, the $\phi_{1+3}$ clock is false. The non-addressed address output lines are discharged to the electrical ground provided by the false condition of the $\phi_{1+3}$ clock signal being $\phi_4$ (and $\phi_2$). The electrical ground connections are provided at points 85, 86, etc. on each alternate address line, e.g., 13, 15, etc. Assuming an address in which $A_1$ through $A_6$are false, as an example, line 12 would remain charged since field effect transistor 30 is held off by the false condition of $A_6$ and field effect transistors 60, 17, 62, 63, and 87 are held off by the false condition of $A_1$ through $A_5$. As a result, the charge on line 12 is not discharged to the electrical ground of point 85 However, line 13 is discharged because field effect transistor 64 representing $\overline{A_6}$ is true. The other lines are similarly discharged. For example, line 14 is discharged because instead of a field effect transistor representing $A_5$, the field effect transistor 89 representing $\overline{A_5}$, is inserted so that line 14 decodes as $\overline{A_1}\ \overline{A_2}\ \overline{A_3}\ \overline{A_4}\ A_5\ \overline{A_6}$. Similarly, line 15 decodes as $\overline{A_1}, \overline{A_2}, \overline{A_3}, \overline{A_4}, A_5, A_6$. The pattern of the field effect transistor between adjacent pairs of address lines for the remaining address decode logic conforms to a binary code.

At the end of $\phi_4$, the $\phi_{1+2}$ clock becomes true so that the isolation field effect transistors 28 and 29 enable the RAM to receive an input in the form of a charged address line from bootstrap field effect transistors 31 or 32. In the example given, the voltage represented by the charge on line 12 is used to provide an output on line 73 from bootstrap driver 32. In other words, bootstrap driver 32 utilizes capacitor 68 to increase the voltage on its gate electrode for providing a relatively higher output voltage on line 73 for the same input voltage. Bootstrap driver 31 provides a similar drive for line 24 when line 14 is addressed. For the example shown, RAM address outputs are shown on every other address line namely lines 12 and 14. This is consistent with the fact that ROM cells are normally smaller in *X* direction than the RAM cells.

The decode logic shown, as indicated above, may represent the *X* address portion of the memory. Assuming the presence of a *Y* address, the information stored at the intersection of the *X* and *Y* address lines, is readout. The circuitry for reading out the information as well as the *Y* address circuitry is not shown. In addition, since the ROM and RAM circuits per se are not the subject of this invention, they have been omited.

ROM address information is similarly processed from terminal 45 and similar terminals corresponding to all of the input lines $A_1$ through $A_6$. The information on terminal 45 is gated to the gate electrodes of field effect transistors 81 and 52 during $\phi_{3+4}$ time. Although the voltage on the gate electrode of 53, when input 45 is true, is reduced by two threshold voltage losses through field effect transistors 80 and 81, it is still sufficient to turn field effect transistor 53 on for clamping point 54 to electrical ground during $\phi_{1+2}$. Following $\phi_4$, $\phi$IB1 becomes true for turning field effect transistor 47 on. As a result, line 21 representing $\overline{A_3}$ is precharged to approximately $-V$.

During $\phi_{1+2}$, the following intervals, the voltage level at point 54 is gated to the gate electrode of field effect transistor 48 and to line 20 representing $A_3$. Assuming the input at 45 was true, line 20 is false and the field effect transistor 48 is held off by the presence of the false signal on its gate electrode. Line 21 remains true. For tht case, the address as described in connection with the RAM address interval would be decoded by line 12, e.g., $\overline{A_1}\ \overline{A_2}\ \overline{A_3}\ \overline{A_4}\ \overline{A_5}\ \overline{A_6}$. The addresses decoded by the remaining lines 13-15, etc., would similarly be the same.

However, if terminal 45 had been false, the voltage on line 21 would have been discharged to the electrical ground provided by $\phi$IB1,2 during $\phi_{1+2}$ and the voltage on line 20 would be driven to a negative voltage level by bootstap transistor 52 during $\phi_{1+2}$. As a result, line 12 would be discharged through field effect transistor 62.

During $\phi_{1+2}$, the isolation transistors 24 through 27 are turned on to permit the voltage on the charged line (decoded address) to be gated to the ROM address via lines 69–72 through bootstrap field effect transistor drivers 33–36. Assuming the ROM address input to be an *X* address, as indicated above, a *Y* address input would also be necessary.

I claim:

1. Address decode logic common to a first and a second memory, said decode logic comprising:
   - a plurality of address output lines for providing address output signals representing decoded address information for delivery to the first or second memory, a plurality of field effect transistors interconnected between adjacent pairs of address lines and whose electrical state represents address bits of the address for a particular line;
   - a first field effect ransistor whose electrical state represents an address bit in electrical series with each alternate address line, and a second field effect transistor connected between adjacent lines and whose electrical state represents the complement of the address bit corresponding to the first field effect transistor;
   - address input lines connected to the gate electrodes of said plurality of field effect transistors and said first and second field effect transistors for providing appropriate address input signals to the field effect transistors;
   - means establishing a memory address cycle comprising first and second address intervals for said first and second memories, respectively; and
   - logic gating means for gating said address input signals for said first memory to the address decode logic during the address interval corresponding to said first memory and for gating address input signals for said second memory to the address decode logic during the address interval corresponding to said second memory.

2. The address decode logic recited in claim 1 and including circuit means for gating the address output signals on said address output lines to the appropriate one of said first memory or said second memory, said circuit means gating the signals representing address information for said first memory to said first memory and gating the signals representing address information for said second memory to said second memory, whereby the address decode logic affords multiplexed processing of said address input signals for providing address output signals to the first and second memories 3. The address decode logic recited in claim 2 and including means for charging said address output lines and each said address input line connected to each said second field effect transistor, whereby gating of said address input signals to said address decode logic and evaluation of said address input signals by said address decode logic serves to discharge all but a selected address output line providing the address output signal, and wherein said means for charging charges said address input line connected to said second field effect transistor prior to the charging of said address output lines.

4. Address decode logic which is time-shared by a first and a second memory during different address intervals of an operating cycle, said address decode logic comprising, decode circuit means having address input lines for receiving address input signals representing address information to be decoded for delivery to one of said first and second memories, said decode circuit means including a plurality of address output lines, means for precharging said address output lines to a first voltage level, means responsive to said address input signals for discharging certain of said address output lines, at least one of said address output lnes remaining charged to provide an address output signal representing the address information decoded by said remaining charged line;

gating means for gating said address input signals to the address decode circuit means, said gating means gating the address input signals for each one of said memories during the address interval corresponding to that one memory; and isolation means connected between said decode circuit means and each memory for connecting said address output lines to one of said memories while isolating said address output lines from the other of said memories.

5. The address decode logic recited in claim 4 wherein said gating means includes means responsive to a multiple phase clocking cycle, said multiple phase clocking cycle being divided into six subintervals, three of said subintervals corresponding to the first memory address interval and the remaining three subintervals corresponding to the second memory address interval, whereby first memory address information is gated through the appropriate gating means and is decoded by said decode circuit means during the three subintervals corresponding to the first memory and the second memory address information is gated through the appropriate gating means and is decoded by said decode circuit means during the remaining three subintervals.

6. The address decode logic recited in claim 4 including an inverter circuit common to said address input lines, said inverter circuit providing precharge voltage levels on selected address input lines prior to the precharge of said address output lines.

7. The logic gating circuitry recited in claim 6 wherein the inverter circuit serves to precharge one of a pair of complemented address input lines.

8. The address decode logic recited in claim 4 wherein said gating means includes first and second parallel input paths providing the address input signals for the corresponding first and second memories, respectively, and clock controlled switching devices for controlling passage of said address input signals along each path, and means for alternately clocking said switching devices to provide alternate address input signals for said first and second memories, respectively.

9. The address decode logic recited in claim 8 wherein said isolation means includes clock controlled switching devices between said decode circuit means and said memories for controlling passage of decoded address information to said memories, and means for alternately clocking said switching devices to supply said decoded address information to the appropriate one of said memories.

10. The address decode logic of claim 4 wherein said first memory is a read-only memory sand said second memory is a random-access memory.

* * * * *

PO-1050
(5/69)

UNITED STATES PATENT OFFICE
CERTIFICATE OF CORRECTION

Patent No. 3,806,880 Dated April 23, 1974

Inventor(s) John R. Spence

It is certified that error appears in the above-identified patent and that said Letters Patent are hereby corrected as shown below:

Column 3, line 20, "address output line" should read -- semiconductor region --;
Column 3, line 21, change "regions" to -- address output lines--.

Column 5, line 9, after "high", delete "," and insert --(i.e. a logical one)--.

line 10, after "low" and before "," insert --(i.e. logical zero) --.

line 24, after "ROM." insert the following per Amendment A (page 11 and 12):

--In operation, the signals on address output lines 12-15 are clocked through isolation transistors 28 and 29 (during $\phi_4$) by the $\phi_{3+4}$ clock connected to their gate and the signals thus delivered to the bootstrap drive circuits 32 and 31 are subsequently driven out to the RAM during $\phi_{1+2}$ by the $\phi_{1+2}$ clock (Figure 4) connected to a main electrode of the bootstrap transistors.

From the above, it is noted that ROM addresses are handled by isolation transistors 24-27 during $\phi_{1+2}$ and are driven out to the ROM during $\phi_{3+4}$ while the RAM addresses are processed at opposite times, i.e. are handled by isolation transistors 28 and 29 during $\phi_{3+4}$ and are driven out to the RAM during $\phi_{1+2}$.

UNITED STATES PATENT OFFICE

CERTIFICATE OF CORRECTION

Patent No. 3,806,880 Dated April 23, 1974

Inventor(s) John R. Spence

It is certified that error appears in the above-identified patent and that said Letters Patent are hereby corrected as shown below:

Consistent with the above, RAM and ROM input address information is processed through logic gating circuitry 5 at different intervals of the memory address cycle. That is, ROM address information is processed for application to the address decode logic 4 during the ROM address interval, while RAM address information is applied during the opposite RAM address interval. The logic gating circuitry 5 comprises two parallel paths, one for ROM information and the other for RAM information. The processing through each path is virtually identical except for the different timing intervals during which each occurs. It should be noted at the onset, referring to Figure 3, that isolation transistor 44 in the RAM processing path and isolation transistor 50 in the ROM processing path provide the requisite timing for applying RAM and ROM information through inverter input logic 6 to the address decode logic 4. RAM isolation transistor 44 is clocked on by the $\phi_{3+4}$ clock (Figure 4) at its gate to pass the RAM information during $\phi_{3+4}$. At all other times, transistor

PO-1050
(5/69)

UNITED STATES PATENT OFFICE
CERTIFICATE OF CORRECTION

Patent No. 3,806,880 Dated April 23, 1974

Inventor(s) John R. Spence

It is certified that error appears in the above-identified patent and that said Letters Patent are hereby corrected as shown below:

44 is off to isolate the RAM processing path from that of the ROM and from the remainder of the circuit. Similarly, the ROM isolation transistor 50 is clocked on during the opposite interval by the $\phi_{1+2}$ clock (Figure 4) at its gate. At all other times, transistor 50 is off.

Considering first the processing of RAM information through logic gating circuitry 5, and assuming that the RAM input signal at 39 is low or false (i.e. logical zero), the input signal is inverted--.

line 24, change "By" to --by--.

Column 6, line 7, change "$\phi_{3+}4$" to --$\phi_{3+4}$-- .

line 38, change "similarly" to --Similarly--.

line 54, change "84" to --81--.

change "81" to --84--.

line 63, change "drive" to --derive--.

Column 7, line 12, change "being" to --during--.

line 44, change "24" to --74--.

line 56, change "omited" to --omitted--.

Column 8, line 9, change "tht" to --that--.

PO-1050
(5/69)

UNITED STATES PATENT OFFICE
CERTIFICATE OF CORRECTION

Patent No. 3,806,880 Dated April 23, 1974

Inventor(s) John R. Spence

It is certified that error appears in the above-identified patent and that said Letters Patent are hereby corrected as shown below:

line 38, change "ransistor" to --transistor--.

Column 10, line 42, change "sand" to --and--.

Signed and sealed this 15th day of October 1974.

(SEAL)
Attest:

McCOY M. GIBSON JR.
Attesting Officer

C. MARSHALL DANN
Commissioner of Patents